(12) United States Patent
Morton (10) Patent No.: US 12,061,309 B2
(45) Date of Patent: Aug. 13, 2024

(54) DRIVE-THROUGH SCANNING SYSTEMS

(71) Applicant: Rapiscan Systems, Inc., Torrance, CA (US)

(72) Inventor: Edward James Morton, Guildford (GB)

(73) Assignee: Rapiscan Systems, Inc., Torrance, CA (US)

(*) Notice: Subject to any disclaimer, the term of this patent is extended or adjusted under 35 U.S.C. 154(b) by 0 days.

(21) Appl. No.: 18/150,269

(22) Filed: Jan. 5, 2023

(65) Prior Publication Data

US 2023/0251398 A1    Aug. 10, 2023

Related U.S. Application Data

(63) Continuation of application No. 16/931,217, filed on Jul. 16, 2020, now Pat. No. 11,579,328, which is a continuation of application No. 15/727,822, filed on Oct. 9, 2017, now Pat. No. 10,754,058, which is a continuation of application No. 14/597,121, filed on Jan. 14, 2015, now Pat. No. 9,817,151, which is a continuation of application No. 12/919,482, filed as
(Continued)

(30) Foreign Application Priority Data

Feb. 28, 2008    (GB) ..................... 0803642

(51) Int. Cl.
*G01V 5/00* (2024.01)
*G01V 5/22* (2024.01)

(52) U.S. Cl.
CPC .............. *G01V 5/232* (2024.01); *G01V 5/224* (2024.01)

(58) Field of Classification Search
CPC ... G01V 5/0016; G01V 5/0041; G01V 5/0066
See application file for complete search history.

(56) References Cited

U.S. PATENT DOCUMENTS 2,831,123 A    4/1958 Daly
3,766,387 A    10/1973 Heffan
(Continued)

FOREIGN PATENT DOCUMENTS

CN    1441914 A    9/2003
CN    1906479 A    1/2007
(Continued)

OTHER PUBLICATIONS

International Search Report PCT/GB2009/000515, Feb. 23, 2010, Rapiscan Security Products, Inc.
(Continued)

*Primary Examiner* — Dani Fox
(74) *Attorney, Agent, or Firm* — Novel IP (57) ABSTRACT

A drive-through scanning system comprises a radiation generating means arranged to generate radiation at two different energy levels and direct it towards a scanning volume, detection means arranged to detect the radiation after it has passed through the scanning volume, and control means arranged to identify a part of a vehicle within the scanning volume, to allocate the part of the vehicle to one of a plurality of categories, and to control the radiation generating means and to select one or more of the energy levels depending on the category to which the part of the vehicle is allocated.

22 Claims, 3 Drawing Sheets

Related U.S. Application Data application No. PCT/GB2009/000515 on Feb. 26, 2009, now Pat. No. 8,971,485.

(56) References Cited

U.S. PATENT DOCUMENTS

| | | |
|---|---|---|
| 3,770,955 A | 11/1973 | Tomita |
| 3,784,837 A | 1/1974 | Holmstrom |
| 4,047,035 A | 9/1977 | Dennhoven |
| 4,139,771 A | 2/1979 | Dennhoven |
| 4,210,811 A | 7/1980 | Dennhoven |
| 4,216,499 A | 8/1980 | Dennhoven |
| 4,366,382 A | 12/1982 | Kotowski |
| 4,430,568 A | 2/1984 | Yoshida |
| 4,566,113 A | 1/1986 | Doenges |
| 4,599,740 A | 7/1986 | Cable |
| 4,626,688 A | 12/1986 | Barnes |
| 4,641,330 A | 2/1987 | Herwig |
| 4,709,382 A | 11/1987 | Sones |
| 4,736,401 A | 4/1988 | Donges |
| 4,788,704 A | 11/1988 | Donges |
| 4,817,123 A | 3/1989 | Sones |
| 4,825,454 A | 4/1989 | Annis |
| 4,872,188 A | 10/1989 | Lauro |
| 4,884,289 A | 11/1989 | Glockmann |
| 4,979,202 A | 12/1990 | Siczek |
| 4,991,189 A | 2/1991 | Boomgaarden |
| 5,015,840 A * | 5/1991 | Blau .............. G08B 13/183 250/221 |
| 5,022,062 A | 6/1991 | Annis |
| 5,065,418 A | 11/1991 | Bermbach |
| 5,091,924 A | 2/1992 | Bermbach |
| 5,098,640 A | 3/1992 | Gozani |
| 5,179,581 A | 1/1993 | Annis |
| 5,181,234 A | 1/1993 | Smith |
| 5,182,764 A | 1/1993 | Peschmann |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis |
| 5,313,511 A | 5/1994 | Annis |
| 5,367,552 A | 11/1994 | Peschmann |
| 5,379,334 A | 1/1995 | Zimmer |
| 5,493,596 A | 2/1996 | Annis |
| 5,548,123 A | 8/1996 | Perez-Mendez |
| 5,638,420 A | 6/1997 | Armistead |
| 5,642,393 A | 6/1997 | Krug |
| 5,642,394 A | 6/1997 | Rothschild |
| 5,652,430 A | 7/1997 | Lee |
| 5,666,393 A | 9/1997 | Annis |
| 5,682,229 A | 10/1997 | Wangler |
| 5,687,210 A | 11/1997 | Maitrejean |
| 5,692,028 A | 11/1997 | Geus |
| 5,751,837 A | 5/1998 | Watanabe |
| 5,764,683 A | 6/1998 | Swift |
| 5,768,334 A | 6/1998 | Maitrejean |
| 5,787,145 A | 7/1998 | Geus |
| 5,805,660 A | 9/1998 | Perion |
| 5,838,759 A | 11/1998 | Armistead |
| 5,903,623 A | 5/1999 | Swift |
| 5,910,973 A | 6/1999 | Grodzins |
| 5,930,326 A | 7/1999 | Rothschild |
| 5,940,468 A | 8/1999 | Huang |
| 5,974,111 A | 10/1999 | Krug |
| 6,031,890 A | 2/2000 | Bermbach |
| 6,058,158 A | 5/2000 | Eiler |
| 6,067,344 A | 5/2000 | Grodzins |
| 6,081,580 A | 6/2000 | Grodzins |
| 6,094,472 A | 7/2000 | Smith |
| 6,151,381 A | 11/2000 | Grodzins |
| 6,188,747 B1 | 2/2001 | Geus |
| 6,192,101 B1 | 2/2001 | Grodzins |
| 6,192,104 B1 | 2/2001 | Adams |
| 6,195,413 B1 | 2/2001 | Geus |
| 6,198,795 B1 | 3/2001 | Naumann |
| 6,218,943 B1 | 4/2001 | Ellenbogen |
| 6,249,567 B1 | 6/2001 | Rothschild |
| 6,252,929 B1 | 6/2001 | Swift |
| 6,256,369 B1 | 7/2001 | Lai |
| 6,278,115 B1 | 8/2001 | Annis |
| 6,282,260 B1 | 8/2001 | Grodzins |
| 6,292,533 B1 | 9/2001 | Swift |
| 6,301,326 B2 | 10/2001 | Bjorkholm |
| 6,320,933 B1 | 11/2001 | Grodzins |
| 6,356,620 B1 | 3/2002 | Rothschild |
| 6,424,695 B1 | 7/2002 | Grodzins |
| 6,434,219 B1 | 8/2002 | Rothschild |
| 6,435,715 B1 | 8/2002 | Betz |
| 6,442,233 B1 | 8/2002 | Grodzins |
| 6,445,765 B1 | 9/2002 | Frank |
| 6,453,003 B1 | 9/2002 | Springer |
| 6,453,007 B2 | 9/2002 | Adams |
| 6,456,684 B1 | 9/2002 | Mun |
| 6,459,761 B1 | 10/2002 | Grodzins |
| 6,459,764 B1 | 10/2002 | Chalmers |
| 6,473,487 B1 | 10/2002 | Le |
| RE37,899 E | 11/2002 | Grodzins |
| 6,483,894 B2 | 11/2002 | Hartick |
| 6,507,025 B1 | 1/2003 | Verbinski |
| 6,532,276 B1 | 3/2003 | Hartick |
| 6,542,574 B2 | 4/2003 | Grodzins |
| 6,542,578 B2 | 4/2003 | Ries |
| 6,542,580 B1 | 4/2003 | Carver |
| 6,546,072 B1 | 4/2003 | Chalmers |
| 6,552,346 B2 | 4/2003 | Verbinski |
| 6,563,903 B2 | 5/2003 | Kang |
| 6,567,496 B1 | 5/2003 | Sychev |
| 6,580,778 B2 | 6/2003 | Meder |
| 6,584,170 B2 | 6/2003 | Aust |
| 6,597,760 B2 | 7/2003 | Beneke |
| 6,606,516 B2 | 8/2003 | Levine |
| 6,636,581 B2 | 10/2003 | Sorenson |
| 6,653,588 B1 | 11/2003 | Gillard-Hickman |
| 6,658,087 B2 | 12/2003 | Chalmers |
| 6,663,280 B2 | 12/2003 | Doenges |
| 6,665,373 B1 | 12/2003 | Kotowski |
| 6,665,433 B2 | 12/2003 | Roder |
| 6,763,635 B1 | 7/2004 | Lowman |
| 6,785,357 B2 | 8/2004 | Bernardi |
| 6,788,761 B2 | 9/2004 | Bijjani |
| 6,812,426 B1 | 11/2004 | Kotowski |
| 6,816,571 B2 | 11/2004 | Bijjani |
| 6,837,422 B1 | 1/2005 | Meder |
| 6,839,403 B1 | 1/2005 | Kotowski |
| 6,843,599 B2 | 1/2005 | Le |
| 6,920,197 B2 | 7/2005 | Kang |
| 7,039,159 B2 | 5/2006 | Muenchau |
| 7,103,137 B2 | 9/2006 | Seppi |
| 7,106,830 B2 | 9/2006 | Rosner |
| 7,166,844 B1 | 1/2007 | Gormley |
| 7,207,713 B2 | 4/2007 | Lowman |
| 8,971,485 B2 | 3/2015 | Morton |
| 2004/0086078 A1 | 5/2004 | Adams |
| 2004/0125914 A1 | 7/2004 | Kang |
| 2004/0141584 A1 | 7/2004 | Bernardi |
| 2004/0258198 A1 | 12/2004 | Carver |
| 2005/0117700 A1 | 6/2005 | Peschmann |
| 2005/0156734 A1 | 7/2005 | Zerwekh |
| 2005/0169421 A1 | 8/2005 | Muenchau |
| 2006/0140341 A1* | 6/2006 | Carver ............... G01V 5/0066 378/57 |
| 2006/0233302 A1 | 10/2006 | Might |
| 2006/0251209 A1 | 11/2006 | Tkaczyk |
| 2007/0098142 A1 | 5/2007 | Rothschild |
| 2007/0110215 A1 | 5/2007 | Hu |
| 2007/0172129 A1 | 7/2007 | Tortora |
| 2007/0210255 A1 | 9/2007 | Bjorkholm |
| 2007/0269005 A1 | 11/2007 | Chalmers |
| 2007/0280416 A1* | 12/2007 | Bendahan ............ G01N 23/04 378/57 |

(56) References Cited

U.S. PATENT DOCUMENTS

2007/0280502 A1 12/2007 Paresi
2008/0044801 A1 2/2008 Modica

FOREIGN PATENT DOCUMENTS

| | | |
|---|---|---|
| CN | 200989907 Y | 12/2007 |
| CN | 101162507 A | 4/2008 |
| EP | 0176314 | 4/1986 |
| EP | 0287707 | 10/1988 |
| EP | 1970700 | 9/2008 |
| EP | 2093561 | 8/2009 |
| EP | 2575118 | 4/2013 |
| GB | 2287164 | 9/1995 |
| GB | 2470161 | 11/2010 |
| GB | 2470163 | 11/2010 |
| GB | 2470330 | 11/2010 |
| WO | 2005098401 | 10/2005 |
| WO | 2006036076 A1 | 4/2006 |
| WO | 2006045019 | 4/2006 |
| WO | 2006078691 A2 | 7/2006 |
| WO | 2007051092 A2 | 5/2007 |
| WO | 2008046259 | 4/2008 |
| WO | 2008046260 | 4/2008 |
| WO | 2008046261 | 4/2008 |
| WO | 2009027667 A2 | 3/2009 |
| WO | 2009137698 | 11/2009 |

OTHER PUBLICATIONS

International Search Report for PCT/GB2009/000556, Feb. 19, 2010, Rapiscan Security Products, Inc.
Texas Instruments datasheet for DDC232; 32-Channel, Current-Input Analog-to-Digital Converter; SBAS331C-Aug. 2004-Revised Sep. 2006.
"Dual_Energy_Detection_of_WMD.pdf", Port Technology International, Jun. 2005; Paul J. Bjorkholm; Port Technology International; PT22-6/4; pp. 1-3 (Jun. 2005).
Kenneth S Kranc—Introductory Nuclear Physics; Chapter 7; Revised Edition Published 1988; pp. 192 to 236; John Wiley & Sons.
Spectral distrbution from end window X-ray tubes; Broil et al; JCPDS-International Centre for Diffraction Data 1999.
US Maritime Security Expo: "Combined Technology for Cargo Security"; Douglas R. Brown PhD; Sep. 2006/p. 1-10.
Proceedings of the SPIE, Sensors, and Command, Control, Communications, and intelligence (C31) Technologies for Homeland Security and Homeland Defence III: "Rapid inspection of cargos at portals using drive-through transmission and backscatter X-ray imaging" Apr. 2004/vol. 5403, No. 1/p. 644-8.
Extract from the prosecution history of U.S. Pat. No. 7,693,261.
Cargo Scanning: WMD detection; Cargo Security International; Paul J. Bjorkholm; Jun./Jul. 2005.
Multi-energy techniques for radiographic monitoring of chemical composition; Nuclear Instruments and Methods in Physics Research Section A: Accelerators, Spectrometers, Detectors and Associated Equipment; vol. 505, Issues 1-2, Jun. 1, 2003, pp. 556-558; Naydenov et al.
IEEE Transactions on Nuclear Science, vol. 50; No. 6: Dec. 2003; Development of X-Ray Scanner Using 450 kVp X-Ray; Kwak et al.
Victor J. Orphan, Ernie Muenchau, Jerry Gormley, and Rex Richardson, "Advanced y ray technology for scanning cargo containers, " Applied Radiation and Isotopes, vol. 63, Issues 5-6, 2005, pp. 723-732.
Invalidation petition against Chinese Patent No. ZL200980113858, Dec. 26, 2022.
Response to the Invalidation petition against Chinese Patent No. ZL200980113858.6 as filed on Feb. 16, 2023.
Invalidation supplementary opinions against Chinese Patent No. ZL200980113858.6, Jan. 28, 2023.
Response to the petitioners supplementary submissions against Chinese Patent No. ZL200980113858.6, Apr. 21, 2023.
Oral Hearing Report for regarding invalidation for Chinese Patent No. ZL200980113858.6, May 10, 2023.
Decision of Invalidation Petition against Chinese Patent No. ZL200980113858.6, Jul. 6, 2023.
Dictionary of Mechanical and Electrical Products, p. 465, Sep. 1999.
Cobalt-60 Digital Radiation Imaging Container Inspection System, p. 56, Apr. 2003.

* cited by examiner

DRIVE-THROUGH SCANNING SYSTEMS

CROSS-REFERENCE

The present application is a continuation application of U.S. patent application Ser. No. 16/931,217, entitled "Drive-Through Scanning Systems" and filed on Jul. 16, 2020, which is a continuation application of U.S. patent application Ser. No. 15/727,822, of the same title, filed on Oct. 9, 2017, and issued as U.S. Pat. No. 10,754,058 on Aug. 25, 2020, which is a continuation application of U.S. patent application Ser. No. 14/597,121, of the same title, filed on Jan. 14, 2015, and issued as U.S. Pat. No. 9,817,151 on Nov. 14, 2017, which is a continuation application of U.S. patent application Ser. No. 12/919,482, of the same title, filed on Jan. 31, 2011, and issued as U.S. Pat. No. 8,971,485 on Mar. 3, 2015, which is a 371 national stage application of PCT/GB2009/000515, filed on Feb. 26, 2009, which relies on Great Britain Patent Application Number 0803642.8, filed on Feb. 28, 2008, for priority. All of the applications above are herein incorporated by reference in their entirety.

FIELD

The present invention relates to scanning systems. It has particular application in scanning systems for cargo, but can also be used in scanners for other applications.

BACKGROUND

There exists a requirement for inspection of cargo for the detection of illicit materials and devices. Currently, a popular way of performing such inspection is through the use of X-ray screening equipment.

In this apparatus, a high energy X-ray source (typically a 4MV to 9MV X-ray linear accelerator) is collimated to a fan beam which irradiates through the cargo item under inspection through to a set of X-ray detectors in a substantially linear configuration.

To form a two-dimensional image from the set of one-dimensional projection data, it is necessary to scan the cargo item through the X-ray beam. This can be achieved by placing the cargo item on a moving floor which moves the cargo item through the X-ray beam with controlled velocity. Alternatively, the X-ray system can be placed on rails and, with the cargo item stationary, the X-ray system can be scanned along the rails to form the image. Alternatively, the X-ray system can be mounted on a vehicle which can be driven past the stationary cargo item to form the image. Alternatively, the cargo item can be dragged through a stationary X-ray beam using a tow truck.

SUMMARY

The present invention provides a drive-through scanning system comprising a radiation generating means arranged to generate radiation and direct it towards a scanning volume, detection means arranged to detect the radiation after it has passed through the scanning volume, and control means arranged to identify a part of a vehicle within the scanning volume, to allocate the part of the vehicle to one of a plurality of categories, and to control the radiation generating means depending on the category to which the part of the vehicle is allocated.

The categories may include at least one of: a human-occupied category, a human un-occupied category, and a cargo category. They may also include an animal-occupied category or a human-or-animal occupied category.

The radiation generating means may be arranged to generate radiation at two different energy levels and the control means be arranged to control the generating means to operate at one of the energy levels depending on the category allocated to the part of the vehicle. The two energy levels may correspond to two different energy spectra, for example one having a higher peak energy, or a higher mean energy, than the other. These may be a high level and a low level, to enable, for example, high energy scanning of a cargo-containing part of the vehicle, and low energy scanning of a human or animal occupied part of the vehicle. Alternatively one of the radiation levels may effectively be zero so that, for example, only un-occupied parts of the vehicle are scanned.

The radiation generating means may include two radiation sources arranged to generate radiation at said two different energy levels, or there may be three or more energy levels, and optionally a corresponding three or more sources.

The control means may be arranged to receive signals from the detection means and to identify the part of the vehicle at least partly on the basis of those signals. In addition, or alternatively, the control means may be arranged to receive signals from the sensing means and to identify the part of the vehicle at least partly on the basis of those signals.

The present invention further provides a method of scanning a vehicle comprising moving the vehicle through a scanning system according to any foregoing claim.

BRIEF DESCRIPTION OF THE DRAWINGS

Preferred embodiments of the present invention will now be described by way of example only with reference to the accompanying drawings in which.

DESCRIPTION OF THE PREFERRED EMBODIMENTS

In the present invention it is recognised that it would be advantageous if the cargo item could be driven through a stationary X-ray inspection system by the normal driver of the vehicle. However, when imaging using a high energy X-ray source, the dose that would be accumulated by the driver during this scanning process would be at an unacceptable level in most commercial operating environments.

A typical dose rate output from a linear accelerator is in the range 10 to 50 Gy/hr at 1 m. For a scan rate of 0.25 m/s, the dose delivered to a driver at 3 m from the X-ray source can be calculated to be in the range 300 to 1500 μSv. This dose per scan is not generally acceptable.

Figure 1:
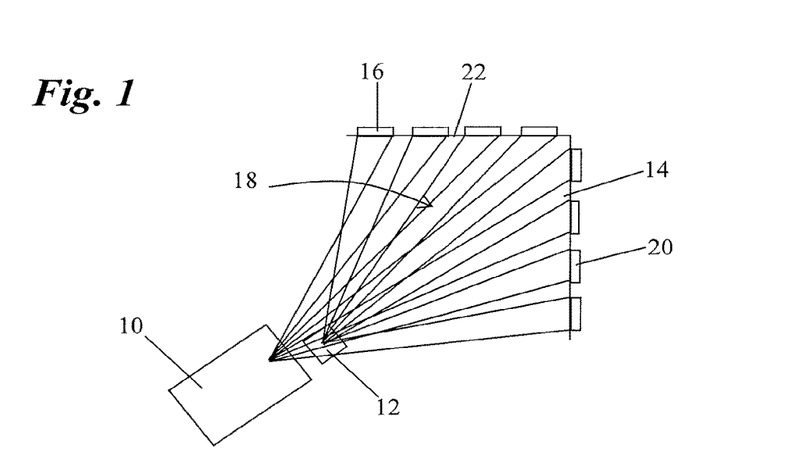
FIG. 1 is a schematic view of a scanning system according to an embodiment of the invention.

However, referring to FIG. 1, in one embodiment of the present invention, a scanning system comprises a high energy X-ray source 10 in the form of a linear accelerator, and a low energy X-ray source 12. The low energy X-ray source 12 can be a stationary or rotating anode X-ray tube operating at a high voltage potential of 60 kVp to 450 kVp. Typically, a tube voltage of 160 kVp provides a good balance between radiation dose, image quality, system reliability and system cost. The high energy X-ray source may comprise stationary anode X-ray tubes. The anode is typically operated at or near ground potential and the cathode is typically operated at negative potential. The anode is then cooled with oil, water or other suitable coolant. In low power X-ray tubes of the low energy source 12, the anode is typically operated at high positive potential and the cathode is typically operate at high negative potential and no direct anode cooling is provided.

A detector system 14 comprises a plurality of detectors 16 arranged to detect X-rays from both of the sources 10, 12. The detectors 16 are arranged around a scanning volume 18, in a vertical array 20 which extends down one side of the scanning volume 18, on the opposite side of it to the sources 10, 12, and horizontal array 22 which extends over the top of the scanning volume. The sources 10, 12 are located close to each other and both in the same plane as the detector arrays. Each of the sources 10, 12 is arranged to generate X-rays in a fan beam in the common plane. The dose rate at the output of a low voltage X-ray generator 12 is substantially less than that from a linear accelerator 10. For example, the dose rate from a standard X-ray source operating at 160 kVp with a 1 mA beam current is typically around 0.3 Gy/hr at 1 m. For a scan rate of 0.25 m/s, the dose delivered to a driver at 3 m from the X-ray source can be calculated to be around 10 μSv per scan.

In one practical embodiment of this invention, the scan of a vehicle including a driver's cab and a cargo container is started using the low energy X-ray source 12 only. As the vehicle is driven through the scanning volume, image data is collected as the driver's cab passes through the X-ray beam. Once the driver's cab has passed through the beam, the high energy X-ray linear accelerator 10 is switched on and the low energy X-ray source 12 is turned off. The main cargo load would be inspected with the full intensity high voltage X-ray beam from the linear accelerator 10 to provide a high level of inspection.

In this hybrid imaging system, the driver will normally be sitting within the cab of a vehicle, and this cab will afford the driver some additional protection which will drop the driver dose further still.

An X-ray beam at 160 kVp beam quality will be able to penetrate through the driver and 10-20 mm of steel so providing inspection capability of many parts of the drivers cab including the tyres, door panels and roof although little inspection capability would be provided in the main engine compartment.

The detector elements in the detectors 16 in a cargo screening system will typically be tuned such that their full scale matches the peak intensity that can be delivered from the X-ray linear accelerator 10. This detector elements are further designed to achieve a dynamic range on the order of 100,000 (i.e. a noise level of around 10 parts per million of full scale range).

With no object present in the beam, the output from the conventional X-ray generator 12 will be equivalent to approximately 0.05% to 0.3% of full scale depending on how the detectors 16 are tuned. After attenuation by the driver and 10 mm of steel, the signal, i.e. X-ray intensity, at the detector 16 is expected to drop by a further factor of 1000. This gives a signal at the detector of 1/20,000 of full scale which is still within the reasonable dynamic range of the detector 16.

Figure 2:
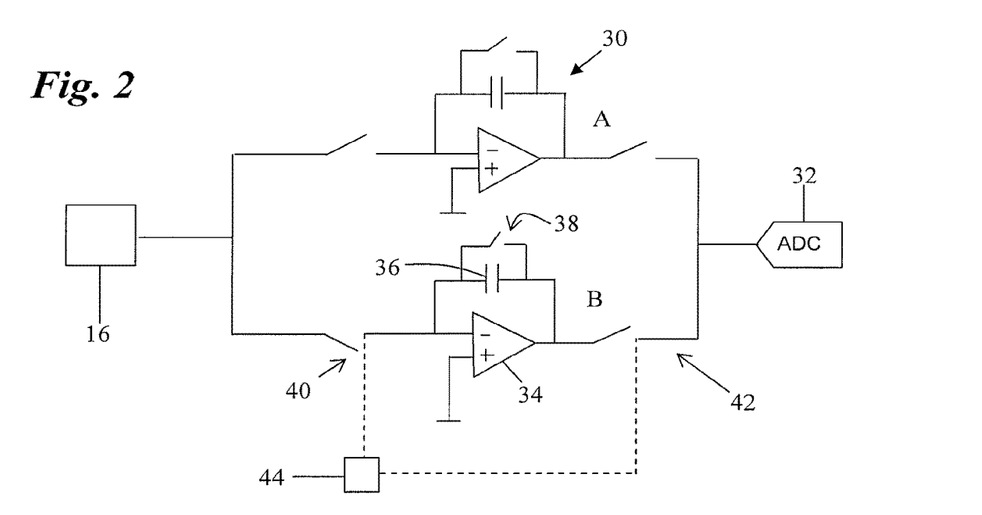
FIG. 2 is a diagram of the data acquisition circuit of a detector of the system of FIG. 1.

Referring to FIG. 2, the scanning system further comprises a data acquisition system that is capable of acquiring and merging the two sets of X-ray image data from the detectors 16, generated by X-rays from the two sources 10, 12 respectively. With reference to FIG. 2, for each detector 16, a preamplifier/integrator circuit 30 is provided with two independent integrator circuits; side A and side B, connected in parallel between the sensor 16 and an analogue-to-digital converter (ADC) 32. Each integrator feeds into the shared ADC 32 through a simple multiplexor.

Each preamplifier/integrator circuit 30 comprises an amplifier 34 in parallel with a capacitor 36 and a re-set switch 38. The input to the amplifier is connected to the sensor 16 by an integrate switch 40 and the output from the amplifier is connected to the ADC by a digitize switch 42. Each of the switches can be closed by a control signal from a controller 44. Closing the integrate switch starts the circuit integrating the signal from the sensor, increasing the charge on the capacitor 36, and opening it stops the integration. Closing the digitizing switch connects the capacitor 38 to the ADC which converts the stored voltage to a digital output signal. The capacitor can then be discharged by closing the re-set switch 38 before the next integration.

Figure 3:
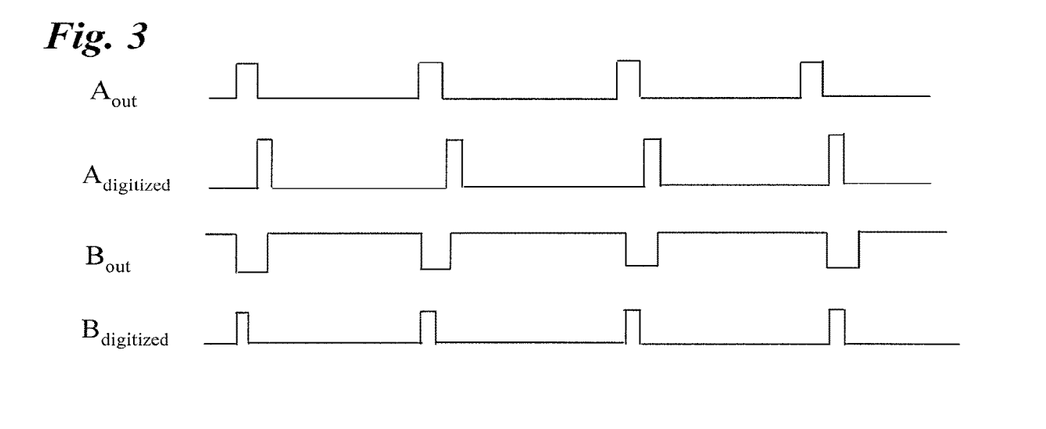
FIG. 3 is a timing diagram showing operation of the circuit of FIG. 2.

As shown in FIG. 3, the integration time on side A, when the control signal $A_{int}$ from the controller 40 is high, is short, while the integration time on side B, when the control signal $B_{int}$ from the controller 40 is high, is long. In each case the integration time corresponds with the time that the appropriate source 10, 12 is turned on, also under control of the controller 40, the source being turned on at the beginning of the associated integration time and turned off at the end of the associated integration time. The sources 10, 12 are therefore turned on alternately. As can be seen from FIG. 3, this means that the low energy source 10 is turned on for relatively long periods, and turned off for shorter periods, and the high energy source 10 is only turned on for the short periods while the low energy source is off. The cycle time is typically on the order of 10 ms with an A side integration time typically of 10 us and a B side integration time of 9.990 ms. In each case, the digitizing switch 42 is closed, by a short pulse in the appropriate control signal $A_{digitize}$ or $B_{digitize}$ from the controller 40, to digitize the integrated signal at the end of the integration time over which integration has taken place.

When imaging with the low energy X-ray source 12, the primary signal is read out using the B side digitised data. When imaging with the linear accelerator source 10, the primary signal is read out using the A side digitised data. It will be appreciated that the timing described above allows the two sources to be used alternately to form alternate two-dimensional image slices, or one of the sources to be turned off so that just one of the sources is used to generate a series of two-dimensional image slices.

In one mode of operation of this embodiment of this invention, when imaging with the high energy X-ray source 10, the low energy X-ray generator 12 is turned off. However the B-side digitised data is used to collect pulse-by-pulse dark offset data which is time and position correlated with the image data from A side and subtracted as dark noise from the imaging signal to provide correction of the imaging signal to correct for the dark noise.

Figure 4A:
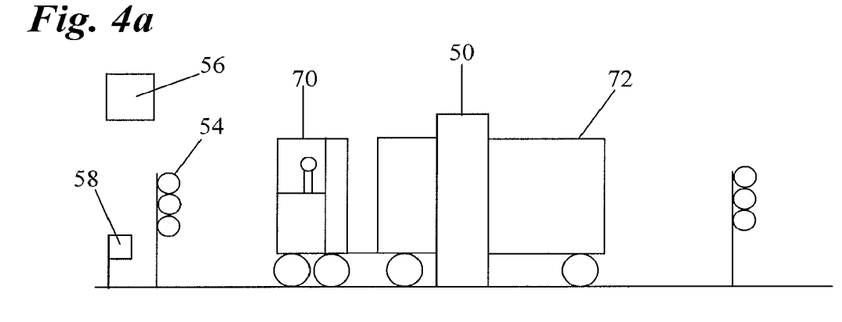
FIGS. 4a and 4b are schematic views of the system of FIG. 1 in use.
Figure 4B:
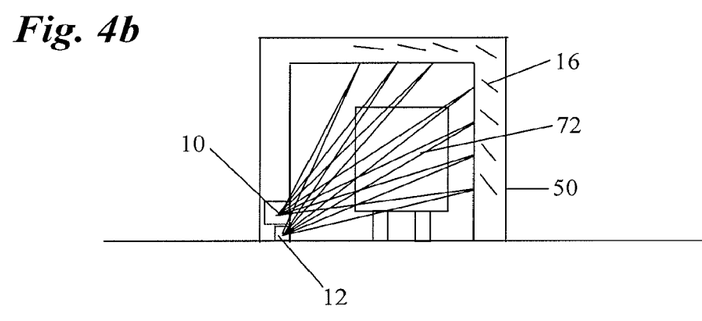
Figure 6:
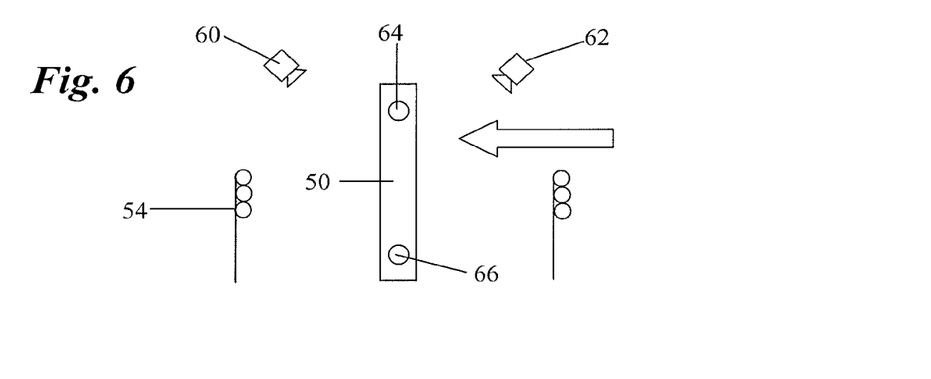
FIG. 6 is a schematic plan view of the system of FIG. 1.

Referring to FIG. 4, the X-ray sources 16 and multi-element detector arrays 20, 22 are located within a fixed housing 50 which is firmly attached to the ground and forms an arch over the scanning volume. The system further comprises a traffic control system which includes a signalling system 52, including traffic lights 54, and a signal display 56, arranged to provide signals to the driver of the vehicle to regulate the speed and/or timing of driving the vehicle through the scanner. The traffic control system further comprises one or more speed detectors, in this case a radar gun 58, arranged to measure the speed of the vehicle. Referring to FIG. 6, the traffic control system further comprises a first camera 60 on one side of the scanner and a second camera 62 on the other side of the scanner. As shown in FIG. 4a, the driver drives the vehicle including the truck 70 and cargo load 72 through the detection system, following speed indications that are provided via the traffic light system. As shown in FIG. 4b, the truck 70 and cargo load 72 pass through the X-ray beam between the X-ray sources 10, 12 and the detector arrays 20, 22.

Figure 5:
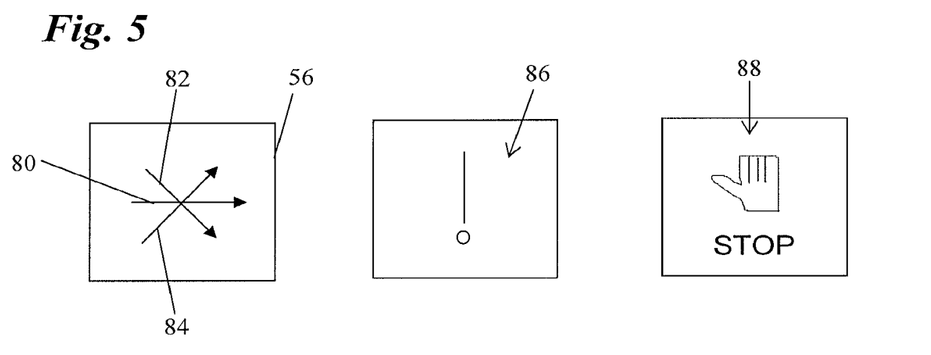
FIG. 5 shows a number of driver instruction signals used in the system of FIG. 1.

To maintain a high quality image, it is preferable that the velocity of the object, in this case the vehicle, under inspection should remain substantially constant throughout the whole of the scanning of the object. The traffic control system is provided for this purpose. The radar speed gun 58 is arranged to continuously monitor the speed of the vehicle, including the load 72 and to feed back to a control unit which controls the visual display 56, mounted by the roadside, which advantageously can be arranged to provide a number of display signals as shown in FIG. 5. At the left hand side of FIG. 5, a horizontal arrow 80 is lit in a green colour when the driver is at the optimal speed, i.e. within a predetermined speed range. When the truck is travelling too fast, a downwards pointing orange coloured arrow 82 will be displayed. Conversely, when the load is travelling too slowly, an upwards pointing arrow 84 will be displayed. If the velocity of the load becomes too low for the scan to continue, or if the load stops, a red '!' sign 86 will be displayed and the scan will be terminated (see middle graphic of FIG. 5). When the load is going much too fast, a red "hand" sign 88 will be displayed and the scan will be terminated (see right hand graphic in FIG. 5). Other traffic control systems can be used, for example giving numerical displays of desired vehicle speeds, The traffic lights 54 (with Red, Amber and Green indicators) are arranged to control the movement of each vehicle to be inspected through the scanner. The use of such traffic control measures substantially reduces the human effort required to co-ordinate scanning of cargo loads. This is advantageous in reducing cost of operation as well as in reducing employee radiation dose exposure.

In a further aspect of this invention, it is necessary to control the imaging system in order to control which one of the two X-ray sources 10, 12 should be switched on at all times during a scan of a vehicle and between scans of different vehicles. To facilitate this process, a small number of video cameras 60, 62 is installed around the X-ray installation, typically as shown in FIG. 6. One camera 60 views the front of the vehicle as it approaches the scanner. Another camera 62 views the rear of the vehicle as it exits from the scanner. A third camera 64 views down between the vertical detector array 20 and the side of the load furthest from the X-ray sources 10, 12. A fourth camera 66 views down between the side of the load closest to the X-ray sources 10, 12 and the vertical supporting structure 50.

Prior to the vehicle entering the image inspection area, all X-ray sources 10, 12 are normally be switched off. As the vehicle enters the image inspection area, the vertical viewing cameras 64, 66 are used to monitor the exact position of the vehicle and to control turn on of the low energy X-ray beam when the front of the vehicle is around 10 cm from the vertical imaging plane. It is prudent to utilise one or more secondary sensors, such as an infra-red light beam to validate the position of the vehicle with respect to the imaging plane. The vertical viewing cameras 64, 66 continue to monitor the position of the vehicle as it moves through the scanning plane, seeking to determine when the trailing edge of the driver's cab 70 has passed through the X-ray beam. Once this feature has been detected, the X-ray linear accelerator source 10 is prepared for operation, but no pulses will be allowed to be generated by that source until such time as the video cameras 60, 62, 64, 66, have detected that the leading edge of the cargo load 72 has entered the imaging plane. At this point, the X-ray linear accelerator is activated to generate a high energy X-ray beam and the low energy X-ray source 12 is turned off. The scan can now proceed until cameras 62, 64, and 66 all verify that the cargo load 72 has exited the imaging plane. At this point both X-ray sources 10, 12 are turned off.

Figure 7:
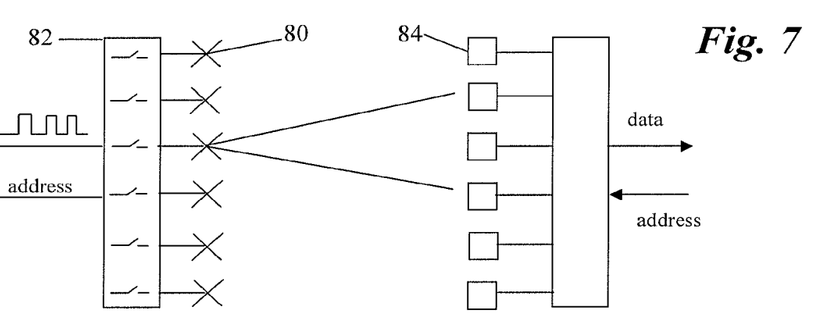
FIG. 7 is a schematic view of an infra-red sensor system of a further embodiment of the invention.

As a secondary safety feature, an infra-red light curtain is provided to illuminate a plane close to, and parallel to, the imaging plane to establish the presence of the vehicle, and determine the vertical profile of the part of the vehicle that is within the imaging plane so as to help determine which part of the vehicle is in the imaging plane. Referring to FIG. 7, in this embodiment, a series of light sources in the form of infra-red light emitting diodes 80 are arranged in a vertical linear array. A control circuit 82 is connected to each LED 80 and comprises a set of addressable switches each connected to a respective one of the LEDs 80. The control circuit 82 is arranged to address each light source 80 in turn to turn it on, and the activated light source is pulsed by a clock pulse at a frequency of typically 10 kHz. Each light source is turned on for typically 1 ms at a time. In an array with 20 light sources, it is then possible to scan the system every 20 ms, or equivalently at a 50 Hz repetition rate.

Figure 8:
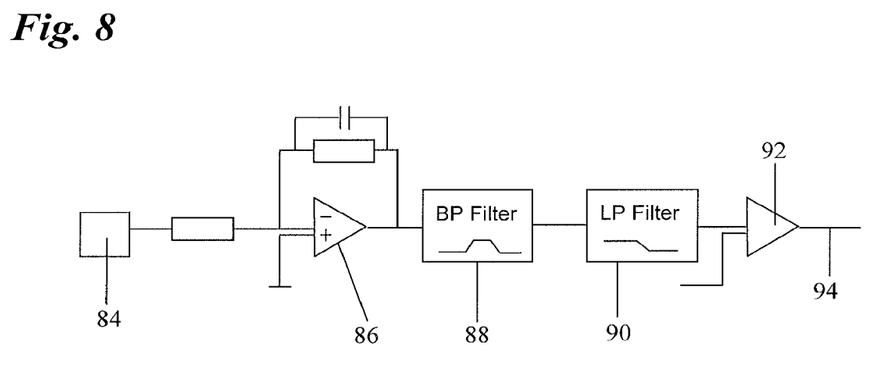
FIG. 8 is a diagram of the detector circuit associated with each of the sensors of the sensor system of FIG. 7.

A series of infra-red sensitive photodiodes 84 are arranged into a vertical linear array on the opposite side of the path of the vehicle to the LEDs, each with their own high speed amplifier. As shown in FIG. 8, the output of each amplifier 86 is passed through a band-pass filter 88 that is tuned to the excitation frequency of the associated light emitting diodes 80, for example 10 kHz. The output from this filter 88 is a switching potential which can be passed into a low pass filter 90 (with a bandwidth of around 1 kHz) which acts to integrate the high frequency switching signal. The output of the low pass filter 90 is then input into a comparator 92 to compare it with a fixed threshold to give a simple binary decision as to whether the receiver 84 is illuminated or not. This binary value for all of the detectors 84 is multiplexed out to a single data line 94 for onwards processing.

The use of a high frequency switching signal with subsequent a.c. coupling is designed to provide good noise rejection independent of ambient temperature for this safety critical signal.

Figure 9:
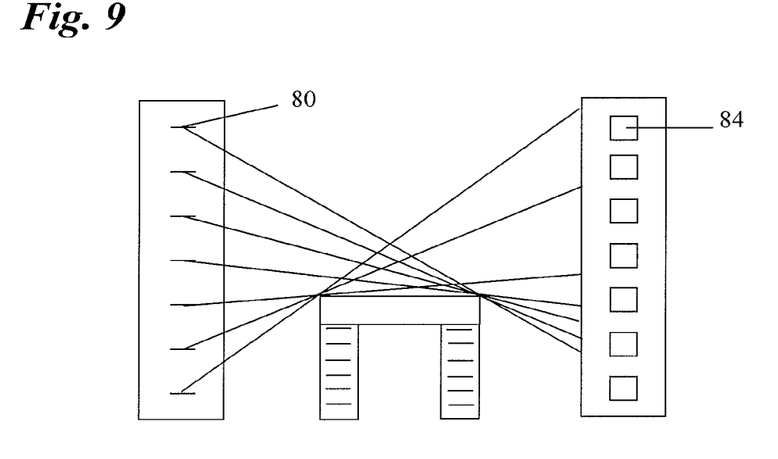
FIG. 9 is a schematic front view of the sensor system of FIG. 7 in operation.

Each emitting light emitting diode 80 is arranged to generate a fan beam of infra-red radiation in a vertical plane so that it will illuminate multiple receivers 84. It is possible to determine the height, and to some extent the profile, of any object in the plane of the beam as shown in FIG. 9 by determining the lowest illuminated light receiver 84 during activation of each of the light sources 80 in turn.

The data on the output 94 from the light curtain is input to the processor 44 by means of which it is processed and coupled with that from the video data in order to establish when the trailing edge of the cab 70 has passed through the inspection plane and the leading edge of the load 72 has arrived.

It will be appreciated that, as well as IR radiation, other wavelengths of electromagnetic radiation, for example visible light, could be used in the light curtain.

In a further modification to this embodiment of the invention, the X-ray data itself is analysed by the controller 44 and interpreted as it is collected on a pulse by pulse basis to determine when the trailing edge of the drivers cab 70 has passed through the scanner and when the leading edge of the cargo load 72 enters the imaging plane of the scanner. In this modification there are now three types of information that indicate independently, and should all correlate to confirm, the passing of the trailing end of the driver's cab 70 and the start of the cargo load 72: (1) video data, (2) infra-red light curtain data, and (3) X-ray image data. These redundant signals are sufficient to build a safety case for the operation of a driver controlled cargo inspection system.

In a practical embodiment of this system, it is likely that non-cargo loads may be inadvertently passed through the inspection system. For example, a bus or coach carrying passengers may be selected for screening. In this case, no high energy X-ray screening should be performed to minimise dose to the passengers. It can be seen that in this case the three-way redundant data analysis system should not pick up the trailing edge of the drivers cab (since there is not one present), and neither should it pick up the start of the cargo load (since there is not one of these either). This means that the high energy X-ray system will not be turned on, but the load will still have been inspected to a reasonable degree using the low energy source.

It is understood that the features noted in our related patent applications filed on even date herewith are equally applicable in this case, specifically patent application numbers GB0803646.9 (Agent's ref ASW42823.GBA), GB0803640.2 (Agent's ref ASW42822.GBA), GB0803641.0 (Agent's ref ASW42820.GBA), and GB0803644.4 (Agent's ref ASW42818.GBA).

The invention claimed is:

1. A drive-through scanning system comprising:
a radiation generating system arranged to generate radiation at different energy levels, wherein the energy levels comprise a first energy level and a second energy level, wherein the first energy level is greater than the second energy level, and wherein the radiation generating system is arranged to direct the radiation towards a scanning volume;
a detector array configured to detect radiation passing through the scanning volume;
an infrared light source configured to illuminate a plane within the scanning volume; and
a controller configured to receive data indicative of a vehicle portion passing through the scanning volume, determine if the vehicle portion passing through the scanning volume meets a condition, and control the radiation generation system to change from the second energy level to the first energy level based on the vehicle portion meeting said condition.

2. The drive-through scanning system of claim 1, wherein the condition is that a cargo occupied portion of the vehicle is entering the scanning volume.

3. The drive-through scanning system of claim 1, wherein the condition is that a human occupied portion of the vehicle is out of the scanning volume.

4. The drive-through scanning system of claim 1, wherein the radiation generating system directs said radiation into the scanning volume within an imaging plane.

5. The drive-through scanning system of claim 4, wherein the infrared light source is configured to determine a profile of the portion of the vehicle that is within the imaging plane.

6. The drive-through scanning system of claim 5, wherein the profile of the portion of the vehicle that is within the imaging plane is a vertical profile.

7. The drive-through scanning system of claim 1, further comprising at least one of a light sensor or camera arranged to be directed toward the scanning volume and generate data indicative of the vehicle portion passing through the scanning volume.

8. The drive-through scanning system of claim 1, wherein the controller is further configured to control the radiation generation system to direct the first energy level or the second energy level to the portion of the vehicle passing through the scanning volume based on determining if the vehicle portion passing through the scanning volume contains cargo to be inspected or a human.

9. The drive-through scanning system of claim 7, wherein the light sensor comprises a light beam generator and a detector configured to determine when the light beam is blocked.

10. The drive-through scanning system of claim 1, further comprising an integration circuit, wherein the detector array is configured to generate at least one detector signal and wherein the integration circuit is arranged to integrate the at least one detector signal over integration times of at least two different time periods.

11. The drive-through scanning system of claim 7, wherein the radiation generating system comprises a first X-ray source configured to generate radiation of the first energy level and a second X-ray source configured to generate radiation of the second energy level.

12. The drive-through scanning system of claim 11, wherein the controller is configured to activate the first X-ray source to direct radiation having the first energy level toward the scanning volume after identifying a trailing edge of a cab of the vehicle based on the data indicative of the vehicle portion passing through the scanning volume.

13. The drive-through scanning system of claim 1, further comprising a movement sensor configured to generate data indicative of a movement of the vehicle, wherein the controller is configured to receive the data indicative of the movement of the vehicle and to the radiation generating system depending on the movement.

14. The drive-through scanning system of claim 7, wherein the controller is configured to determine a trailing edge of a cab of the vehicle based on the data indicative of the vehicle portion passing through the scanning volume.

15. The drive-through scanning system of claim 1, further comprising a display configured to display instructions to a driver of the vehicle, wherein the controller is configured to control the display.

16. A drive-through scanning system comprising:
a radiation generating system arranged to generate radiation at different energy levels, wherein the energy levels comprise a first energy level and a second energy level, wherein the first energy level is greater than the second energy level, and wherein the radiation generating system is arranged to direct the radiation towards a scanning volume;
a detector array configured to detect radiation passing through the scanning volume;

an infrared light source configured to illuminate a plane within the scanning volume; and a controller configured to receive data indicative of a vehicle portion passing through the scanning volume, determine if the vehicle portion passing through the scanning volume meets a condition, and control the radiation generation system to change from the second energy level to the first energy level based on the vehicle portion meeting said condition, wherein the condition is that a cargo occupied portion of the vehicle is entering the scanning volume and that a human occupied portion of the vehicle is out of the scanning volume.

17. The drive-through scanning system of claim 16, wherein the radiation generating system directs said radiation into the scanning volume within an imaging plane.

18. The drive-through scanning system of claim 17, wherein the infrared light source is configured to determine a profile of the portion of the vehicle that is within the imaging plane.

19. The drive-through scanning system of claim 18, wherein the profile of the portion of the vehicle that is within the imaging plane is a vertical profile.

20. The drive-through scanning system of claim 16, further comprising at least one of a light sensor or camera arranged to be directed toward the scanning volume and generate data indicative of the vehicle portion passing through the scanning volume.

21. The drive-through scanning system of claim 16, wherein the radiation generating system comprises a first X-ray source configured to generate radiation of the first energy level and a second X-ray source configured to generate radiation of the second energy level.

22. The drive-through scanning system of claim 21, wherein the controller is configured to activate the first X-ray source to direct radiation having the first energy level toward the scanning volume after identifying a trailing edge of a cab of the vehicle based on the data indicative of the vehicle portion passing through the scanning volume.

* * * * *